May 24, 1932.  J. N. JACOBSEN  1,859,827
FOAM REDUCING APPARATUS
Filed April 22, 1930   3 Sheets-Sheet 2
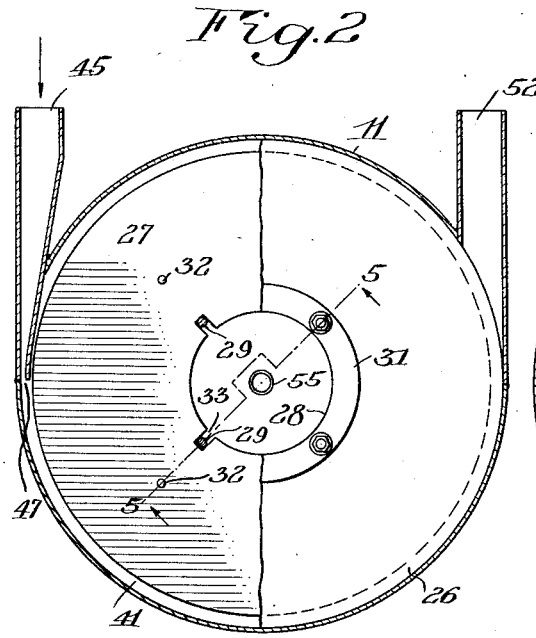
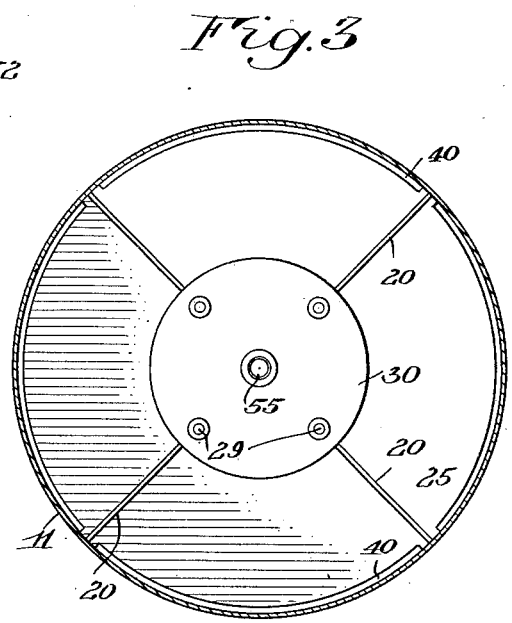
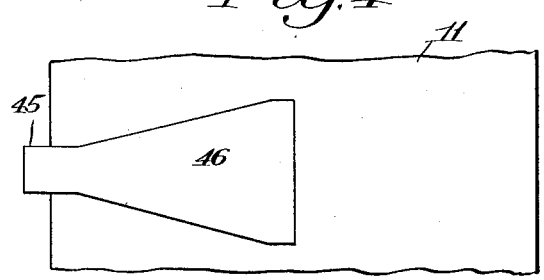
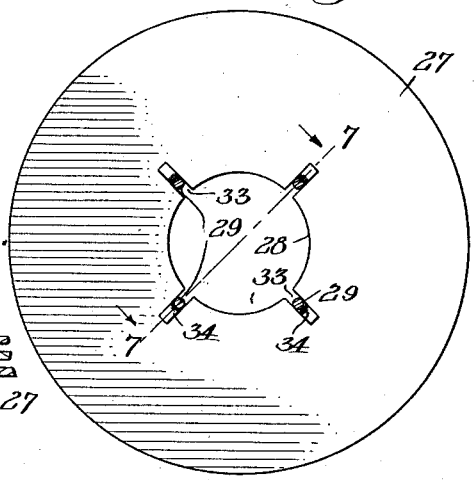
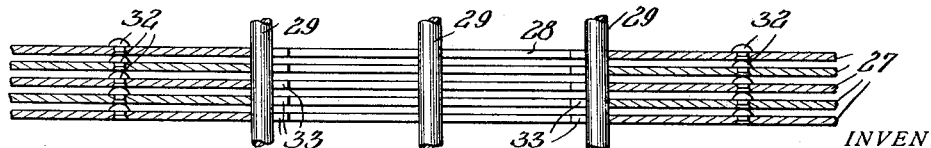
INVENTOR
Jens N. Jacobsen
BY Edward H. Cumpston
his ATTORNEY

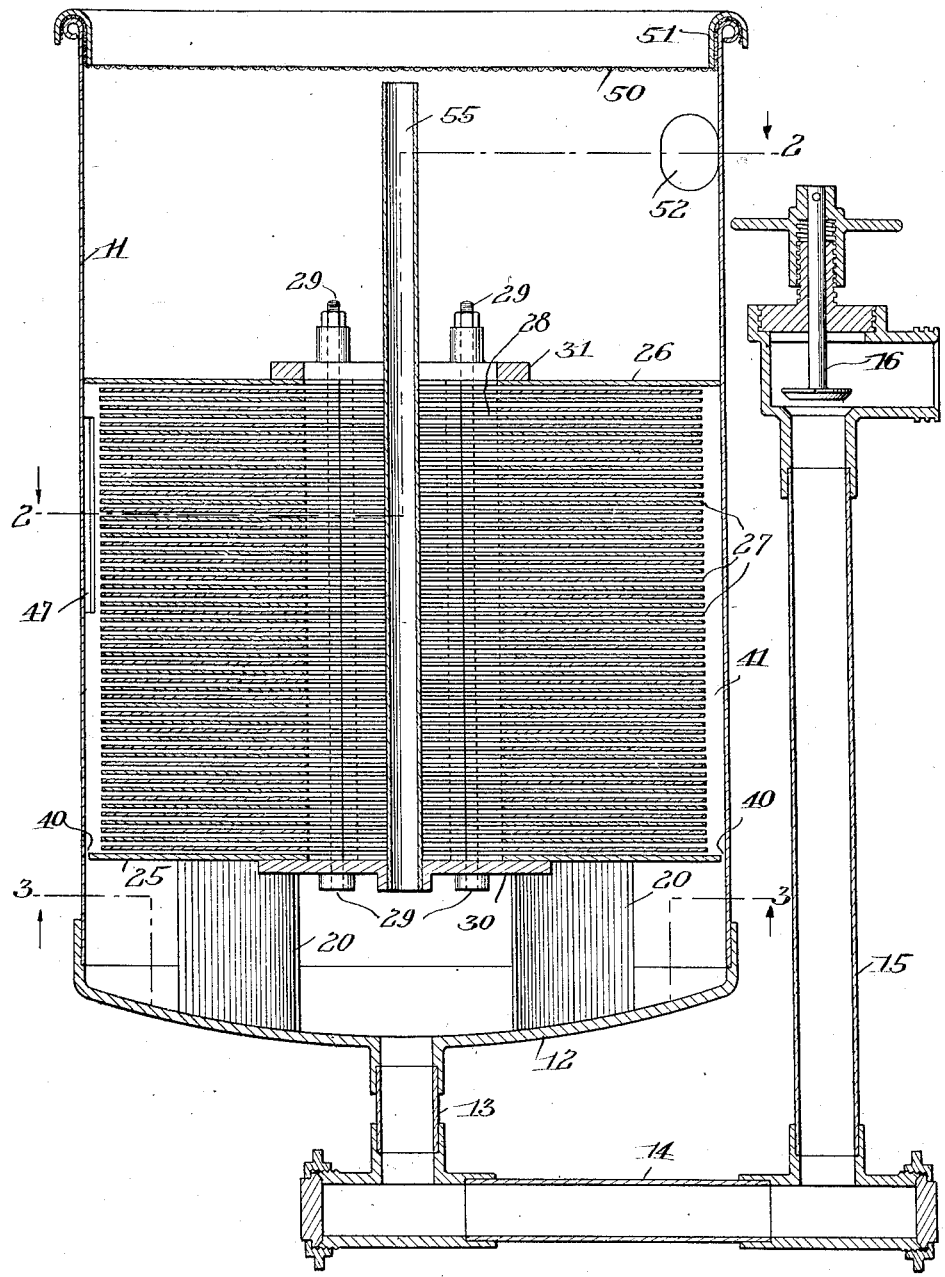

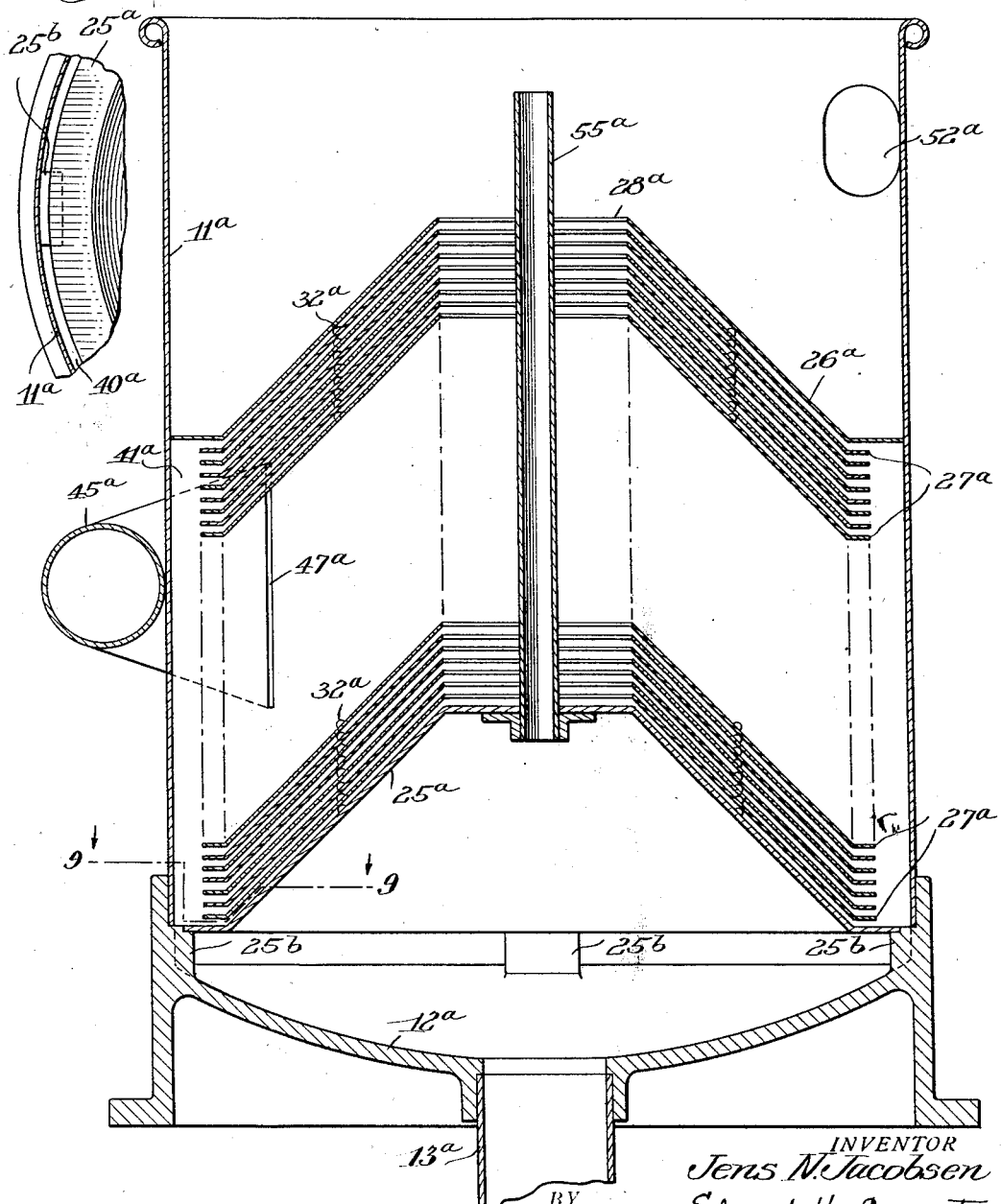

Patented May 24, 1932

1,859,827

UNITED STATES PATENT OFFICE

JENS N. JACOBSEN, OF ROCHESTER, NEW YORK, ASSIGNOR TO THE PFAUDLER CO., OF ROCHESTER, NEW YORK, A CORPORATION OF NEW YORK

FOAM REDUCING APPARATUS

Application filed April 22, 1930. Serial No. 446,383.

This invention relates to apparatus for eliminating or greatly reducing the foam in various foamy liquids such as milk. When milk is skimmed by use of the ordinary type of cream separator, a large amount of air becomes incorporated in the skimmed milk and this causes the milk to foam excessively when it is discharged into vats or tanks for storage or for the manufacture of various skimmed milk products. Foaming is also likely to occur in liquids other than skimmed milk wherever such liquids have had air incorporated in them in one way or another.

An object of the present invention is to provide a simple and satisfactory apparatus for greatly reducing or substantially eliminating the foam in foamy liquids.

Another object is to provide foam reducing apparatus which is compact, which has no moving parts to get out of order, which may be kept clean and sanitary comparatively easily, and which may be maintained and operated satisfactorily by comparatively inexperienced persons.

To these and other ends the invention resides in certain improvements and combinations of parts, all as will be hereinafter more fully described, the novel features being pointed out in the claims at the end of the specification.

In the drawings:

Fig. 1 is a vertical section taken centrally through a preferred embodiment of the apparatus;

Fig. 2 is a horizontal section substantially on the line 2—2 of Fig. 1;

Fig. 3 is a horizontal section substantially on the line 3—3 of Fig. 1;

Fig. 4 is a side elevation of a fragment of the apparatus, showing the tangential nozzle entering the container;

Fig. 5 is a fragmentary vertical section through some of the partition members taken substantially on the line 5—5 of Fig. 2, illustrating details;

Fig. 6 is a plan of a modified form of a partition member with the tie rods in section;

Fig. 7 is a section taken substantially on the line 7—7 of Fig. 6;

Fig. 8 is a vertical section taken centrally through a modified form of apparatus, and Fig. 9 is a section taken substantially on the line 9—9 of Fig. 8.

Similar reference numerals through the several views indicate the same parts.

The preferred embodiment of the apparatus, illustrated in Figs. 1 to 5, inclusive, comprises a suitable container 11 preferably of cylindrical form and having its axis substantially vertical. The top of the container is preferably open, though it may be closed and suitably vented, and the bottom 12 is dished downwardly toward the center as shown. From the center leads an outlet conduit 13 of sanitary construction which may be quickly disassembled for sterilization and reassembled, this conduit having a horizontal portion 14 leading to a vertical pipe 15 having a control valve 16 therein. After passing the valve 16, the conduit leads to any desired point such as a vat or tank in which the liquid is to be stored or processed.

Resting upon the bottom 12 of the container is a plurality of baffle plates 20, four of these being shown in the present instance, which plates extend radially from the periphery of the container toward the center and which prevent any substantial rotary or swirling action in the liquid adjacent the bottom of the container. These plates do not extend all the way to the center of the container, however, and thus there is ample space for liquid within the container to flow toward the center and to reach the outlet conduit 13.

The plates 20, in addition to serving as baffles, also have the function of supports for an assembly of partition members. This assembly preferably comprises a bottom partition member 25 resting upon the top edges of the baffle plates 20, a top partition member 26, and a considerable number of intermediate partition members 27 spaced from each other and lying between the members 25 and 26. All of these partition members are preferably cut away or apertured at their centers as at 28 and tie rods 29 pass substantially vertically through slots formed at the edges of the apertures 28, these rods cooperating with the sides of the slots to prevent rotation of the partition members relative to the rods. The bottom ends of the tie rods 29 press upwardly against a plate 30 which extends across and closes the aperture in the bottom partition member 25, while the upper ends of the tie rods pull downwardly upon an annular collar 31 placed around the aperture of the top partition member 26 without closing this aperture. Thus the tie rods secure all of the partition members firmly together into a unitary assembly, pressing the members against suitable spacing elements which keep them spaced the required amount from each other.

As shown in Fig. 5, the spacing elements preferably take the form of rivets 32 in each partition member, each of these rivets having, for example, a round head on one side of its partition member and a flat counter-sunk head on the opposite side. Thus the partition members will be spaced from each other an amount equal to the height of the rivet heads.

In Figs. 6 and 7 there is shown another form of spacing means. In this instance, the material from the slots 33 which are formed at the edges of the aperture 28 is bent back flat upon the body of the partition 27 as shown at 34, and thus forms a projection from the face of the partition member which serves to space this member from the adjacent member. Obviously various other forms of spacing means may be employed, but it is desirable to utilize means which may be kept in sanitary condition and which will not provide crevices or cavities in which bacteria may breed.

The bottom partition member 25 is of a diameter slightly less than the inside diameter of the container 11, so that a passageway 40 is provided around the edges of this partition member. The intermediate partition members 27 preferably are of still less diameter, to provide a somewhat larger annular passageway 41 extending around the intermediate partition members throughout the entire height thereof. The top partition member 26 preferably fits the container 11 fairly snugly to provide a substantially liquid tight joint without any passageway at the edges of this partition member, although the fit is sufficiently loose so that the entire partition assembly may be lifted out of the container to be cleaned and sterilized and may be reinserted therein easily.

Leading into the side of the container 11 in a generally tangential direction and at a point opposite the intermediate partition members 27 there is an inlet conduit 45 widening out at 46 to form a long and narrow inlet slit or nozzle 47. This conduit is connected to the supply of liquid to be treated, such for example as skimmed milk, and suitable pumping means or a gravity supply is arranged in the conduit so that the liquid passes through the nozzle 47 with sufficient velocity to cause rotation of the body of liquid within the container 11. The rotation of the liquid in the spaces between the partition members causes the denser liquid which is free or substantially free from foam to travel toward or remain at the periphery of the container, while the lighter or foamy portion of the liquid travels inwardly toward the center of the partition members and passes upwardly through the central apertures 28. Also, bubbles of foam gather upon the surfaces of the partition members and gradually travel toward the center until they reach the central apertures up which they pass.

It will be noted that the partition assembly is mounted in stationary position within the container, and that the swirling or rotary action of the liquid is not caused by any moving parts of the apparatus, but by the fact that the liquid is introduced in a generally tangential direction. It is found in practice that to attempt to revolve a set of partition members or disks within the container is not wholly satisfactory. While some of the foam may be eliminated in this manner, a large proportion of the foam is compressed into the liquid and, in the case of milk, causes the liquid to form a thick scum. In the present apparatus, however, where the disks or partition members are stationary and where the rotation of the liquid is produced by means other than movement of the partition members, the results are found to be highly satisfactory and the foam is easily separated from the liquid without compressing it into the liquid in an undesirable manner.

The control valve 16 will ordinary be adjusted to throttle down the flow through the discharge conduit to such an extent that the liquid level within the container 11 will be maintained slightly above the top partition member 26. As the foam accumulates on the top of the liquid, and rises higher and higher toward the open top of the container, it comes into contact with a screen 50 extending across the top of the container and held in place by a flange 51 forced into the container as shown in Fig. 1. This screen is preferably formed of cheesecloth or the like, though a fine metallic screen may be employed if desired. As the foam comes into contact with this screen, the screen breaks up the foam bubbles and prevents the foam from overflowing at the top of the container. If the liquid level rises toward the top of the container, the liquid may overflow through an overflow conduit 52, and some of the foam may pass out through the same conduit.

In order to prevent air from accumulating beneath the bottom partition member 25 when operation of the apparatus is started, a vent pipe 55 is provided extending through the plate 30 and passing upwardly through the apertures 28 in the intermediate partition members as illustrated in Fig. 1. This vent pipe permits any air beneath the bottom partition member to escape upwardly, but prevents any foamy liquid near the top of the container from flowing downward and becoming mixed with the liquid in the bottom of the container which is substantially free from foam.

In operation, the foamy liquid entering through the conduit 45 and tangential nozzle 47 creates a rotary motion in the liquid within the container. This rotary motion takes place in all of the relatively thin layers of liquid in the spaces between the various partition members, which are relatively close together. On account of the centrifugal force created by this rotary motion, the denser liquid which is free from foam tends to move outwardly toward the circumference, and may flow downwardly through the passageway 41 at the periphery of the intermediate partition members 27, through the passageway 40 at the periphery of the bottom partition member 25 and into the space at the bottom of the container. Here the baffle plates 20 prevent any substantial rotary movement of the liquid, and the quiet liquid, now free or substantially free from foam, is withdrawn through the discharge conduit 13.

The lighter particles of liquid which contain foam gradually work toward the center of the partition members until they reach the central apertures 28, through which they pass upwardly to the top of the partition assembly. Foam bubbles gathered upon and clinging to the surfaces of the partition members, gradually work inwardly along this surface or toward the center until they reach the apertures 28 and pass upwardly. Once they have passed above the top partition member 26, they cannot again pass below the member 26 because of the substantially liquid tight fit of the periphery of this member against the walls of the container. The foam accumulates on top of the partition assembly and rises until it comes into contact with the screen 50, when the foam bubbles are broken up as above mentioned.

It will be seen that once the foam and the liquid are separated from each other, they travel along different paths and do not again come into contact with each other. The foam travels upwardly at the center of the apparatus through the apertures 28, while the defoamed liquid travels downwardly at the periphery of the apparatus through the passageways 41 and 40.

In Figs. 8 and 9 there is shown a slightly modified form of construction also embodying the principles of the present invention. Here the baffle plates 20 are omitted, and the bottom partition member 25a rests upon four lugs 25b at the edges of the bottom 12a of the container 11a. The bottom partition member 25a and the intermediate partition members 27a may otherwise be similar to the corresponding elements of the first described embodiment of the invention, except that the partition members are all dished upwardly or of somewhat conical shape, as illustrated clearly in Fig. 8. The partition members may be spaced from each other as by rivets 32a or in any other suitable way. All of the other parts of the apparatus, including the inlet nozzle, the outlet and overflow conduits, the screen, and the vent pipe, may be substantially the same as in the embodiment previously described, and need not be further described here.

This modified form of apparatus, having dished partition members, may be more satisfactory in use in connection with certain liquids, although ordinarily it is found that the embodiment first described gives excellent results and is quite satisfactory when foamy milk is the liquid being treated. In both embodiments here illustrated, the partition members extend in a generally transverse direction across the container, and in both forms the partition members are stationary, the rotary movement of the liquid being caused by means other than the partition members.

The apparatus has been found in use to be exceedingly satisfactory when employed in connection with milk, and substantially all of the foam usually present in skimmed milk is eliminated by this apparatus, so that the milk may be easily passed into vats or tanks without foaming.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Foam reducing apparatus comprising, in combination, a liquid container, a series of partition members extending in a generally transverse direction in said container beneath the liquid level, means for introducing foamy liquid into said container in such a way that the liquid tends to rotate between said partition members and the foam tends to separate from the liquid, and baffle means in the container beneath said partition members, for reducing rotary movement of the liquid near the bottom of the container, said baffle means serving also to support said partition members.

2. Foam reducing apparatus for milk and the like, comprising a liquid container, a series of normally stationary partition members spaced relatively close to each other and extending in a generally transverse direction across said container below the normal liquid level therein, the edges of said partition members being relatively close to but spaced slightly from the sides of said container, said partition members having substantially central apertures of relatively large size, and means for introducing foamy liquid into said container in a generally tangential direction so that said liquid tends to revolve between said partition members and the foam tends to separate from the liquid and pass upwardly through said apertures.

3. Apparatus according to claim 2, in which said partition members are secured to each other and are relatively free from said container so that said partition members may be readily removed as a unit from said container for cleaning and sterilization.

JENS N. JACOBSEN.